(No Model.) 2 Sheets—Sheet 1.
P. V. WADLEIGH.
BROADCAST SEED SOWER.
No. 462,341. Patented Nov. 3, 1891.
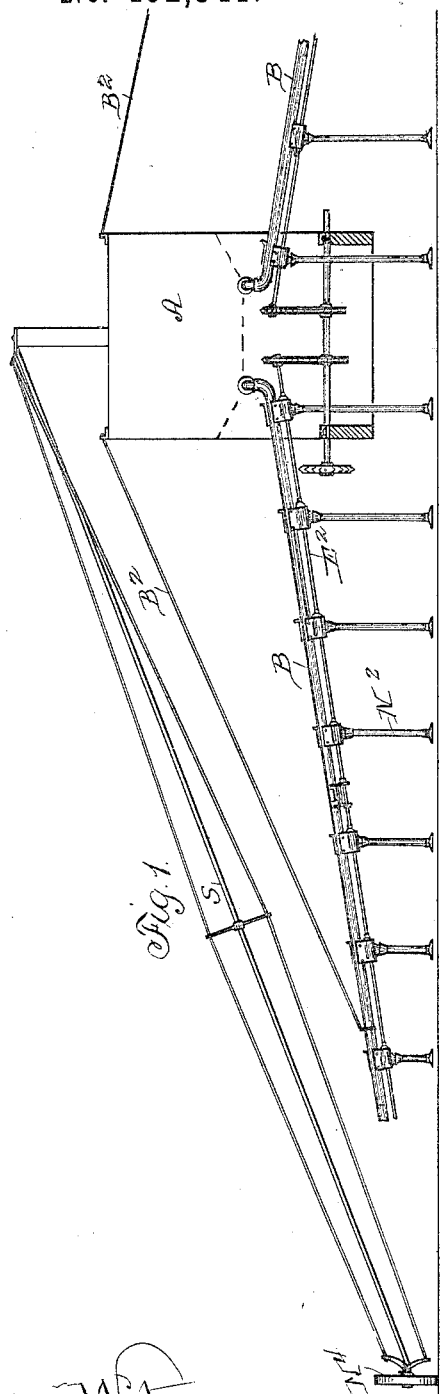
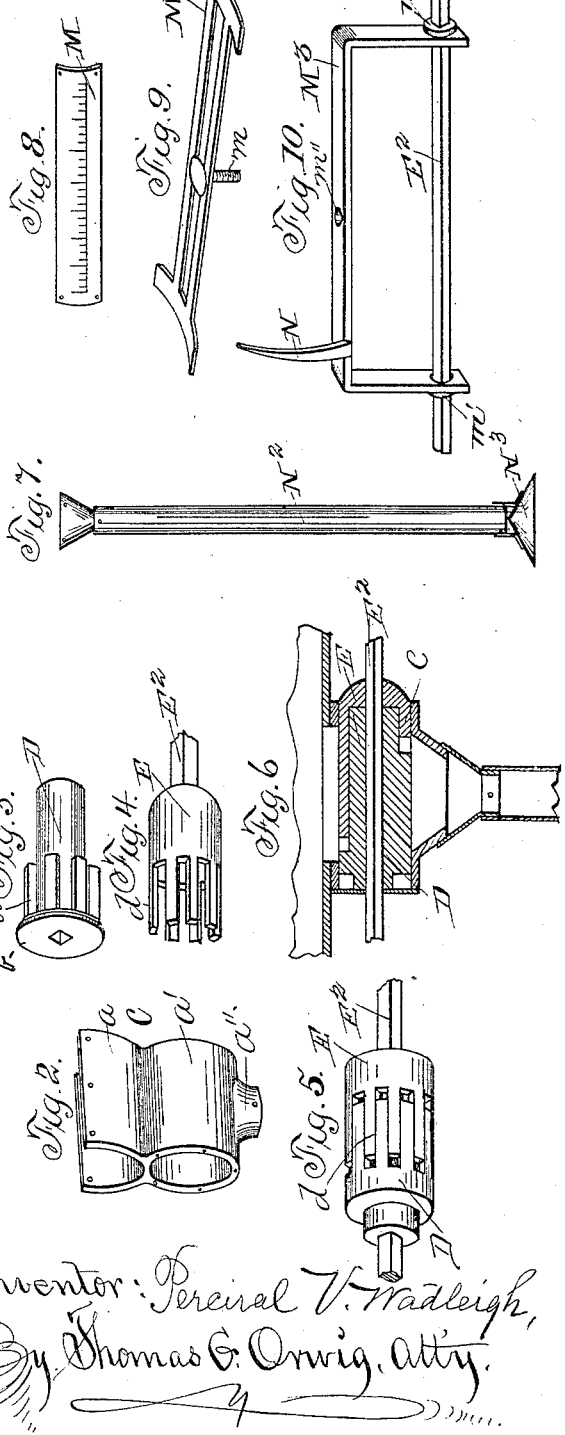

(No Model.) 2 Sheets—Sheet 2.
P. V. WADLEIGH.
BROADCAST SEED SOWER.
No. 462,341. Patented Nov. 3, 1891.
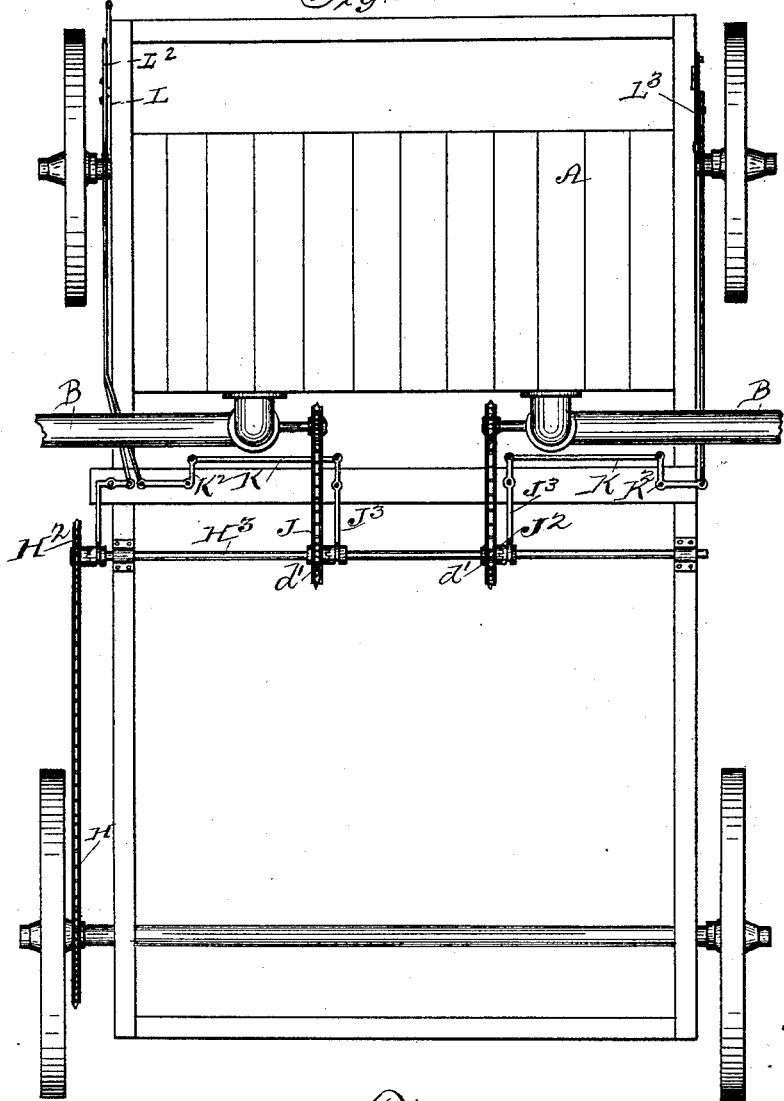
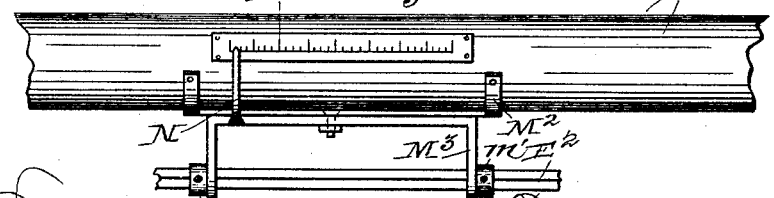
Witnesses: Inventor: Percival V. Wadleigh,
M. P. Smith
R. H. Orwig } By Thomas C. Orwig, Att'y.

UNITED STATES PATENT OFFICE.

PERCIVAL V. WADLEIGH, OF WEST SUPERIOR, WISCONSIN.

BROADCAST SEED-SOWER.

SPECIFICATION forming part of Letters Patent No. 462,341, dated November 3, 1891.

Application filed February 14, 1891. Serial No. 381,505. (No model.)

*To all whom it may concern:*

Be it known that I, PERCIVAL V. WADLEIGH, a citizen of the United States, residing at West Superior, in the county of Douglas and State of Wisconsin, have invented a new and useful Broadcast Seeder and Marker, of which the following is a specification.

My invention has for its object the provision of means by which seed may be readily confined and spread uniformly over a wide area automatically in the advance of the machine and by which a line may be marked in the forward travel of the machine to serve as a guide for the operator.

My invention consists in a suitable supporting-carriage, on which is located a seed-containing box, into which open tubular seed-conveyers, which latter when in operation are extended on each side of the carriage, approximately at right angles thereto, these tubes being held or fixed to the seed-containing box by means of a flexible or universal elbow-joint, so that the conveyers may be arranged upon the carriage in transportation.

Openings are provided at intervals along the conveyers, at which points the feed-cups are attached and within which the predetermined amount of grain is delivered from the conveyer-tubes into the scattering-spouts, at the lower end of which scatterer-disks are located, said feeds being rotated in the cups initially from one point of operation and regulated in order to meet the various requirements, the amount of feed being determined by a scale.

My invention consists, further, in certain details of construction, hereinafter to be described, reference being had to the accompanying drawings, in which—

Figure 1 is a rear view of the supporting-carriage, showing the seed-box in elevation and also the conveyer-tubes. Fig. 2 is a detail view of one of the seed-cups. Figs. 3 and 4 represent detail views of the two parts of the seed-wheels. Fig. 5 is a like view showing the said two parts joined. Fig. 6 is a detail sectional view of the seed-wheels within the feed-cups. Fig. 7 is a detail view of the scattering-spout. Figs. 8, 9, and 10 are details of the parts for regulating the feed of grain and indicating the amount of feed. Fig. 11 is a plan view of the supporting-carriage, showing the drive-gear. Fig. 12 is an enlarged view of the regulating and indicating device shown applied.

A designates the seed-containing box, which, as shown, is mounted upon a suitable supporting-carriage. The seed-box A is formed with a hopper-bottom, as indicated by the dotted lines, Fig. 1.

B B are seed-conveying tubes, which open into the seed-box A and are fixed thereto, being held in an inclined position by means of stays $B^2$ $B^2$, secured to the seed-box A, the inclination being from the said box to the outer ends of the said conveyers B B, so that the seed shall normally tend to travel to the extreme end of the conveyers. At intervals on the lower side of the said conveyers B B are openings, at which points the seed-cups C C (shown in detail in Fig. 2) are secured, said cups consisting of the saddle $a$, the tubular portion $a'$, and the discharge-spout $a''$.

The feed-wheels, Figs. 3, 4, and 5, are in two parts D and E, the former having a square axial longitudinal perforation, through which the actuating rod or shaft $E^2$ rotates, as hereinafter described, said part D being held in place rigidly within the feed-cups C C by means of a collar $b$. The counterpart E also has a central longitudinal perforation, through which said rod or shaft $E^2$ passes, this counterpart E being keyed to said shaft $E^2$. The fingers $d$ of the two parts D and E are adapted to intermesh, as shown in Fig. 5. The actuating rod or shaft $E^2$ is driven in the following manner:

Secured to one of the wheels of the supporting-carriage is a sprocket-wheel H, Fig. 2, which latter is connected with a sprocket-wheel $H^2$, mounted loosely on the end of a counter-shaft $H^3$, the latter being mounted on bearings on the carriage. Also mounted loosely on the said counter-shaft $H^3$ are the sprocket-wheels J and $J^2$, which are provided with the parts of a clutch at their hubs $d'$ $d'$.

K are rods connecting the ends of the levers $J^3$ with the bell-crank levers $K^2$, the latter being respectively connected to the hand-levers $L^2$ and $L^3$.

Referring now to the device for regulating and determining the feed, (shown in Figs. 9, 10, and 11,) M is an index-plate, which is secured to the conveyer-tubes preferably at a point intermediate of the ends of said conveyer-tubes. M² is a slotted plate adapted to be secured to the under side of the conveyer at the point where the index-plate M is located, said plate M having a connecting-screw m traveling in the slot therein. M³ is a three-sided frame, which is mounted upon the shaft E² and held in position thereon by means of collars m' m'. The said frame M³ carries the index-finger N, which being in a vertical position and the frame being fixed on said shaft E² at the point of attachment of the index-plates M the said index-finger is adapted to assume varying positions on the scale of the plate. The upper part of frame M³ is perforated at m'' screw-threaded, and thus adapted to receive the connecting-screw m. N² are scattering-spouts fixed at intervals along the conveyer-tubes B B, located at the seed-cups C C to receive the grain therefrom. N³ are scattering-disks located at and secured to the lower ends of the spouts N². These spouts vary in length as they approach the extremities of the conveyer-tubes. S is a laterally-extending arm carrying at one end the marker-wheel N⁴, secured to the upright on the supporting-carriage.

The operation of my invention is as follows: In the forward travel of the carriage, assuming the sprocket-wheels H², J, and J² to be in gear with the counter-shaft H³, the shafts or rods E² on each side of the carriage are rotated. The grain is being constantly fed for the whole length of the conveyer-tubes B B, so that the latter are within the grain-cups at all times. The part of the feed-wheels D being fixed within the seed-cups rotates with the shaft E², but has no capability of lateral movement, while the part E rotates with said shaft, and also has a lateral adjustment thereon. The fingers d of the two parts, intermeshing, form pockets filled in by the grain, and in the rotation of the feed-wheels on shaft E² this grain is deposited in the scattering-spouts N², is diverted broadcast, and in its travel through the spouts is protected from the wind. The operator may adjust the feed-wheels and regulate the amount of grain fed by lateral movement of the shafts E², the finger N indicating on the index-plate M the amount of feed. In the movement of the shaft E² the connecting-screw m travels within the slotted frame M². By adjustment of the lever L both of the shafts E² cease to operate, since the sprocket-wheel H² rotates loosely on the counter-shaft H³. Either shaft E² may be operated independently by adjustment of levers L² or L³ for disconnecting the sprocket-wheels J or J². By means of the marker-wheel a line is formed indicating the return.

Having thus described my invention, what I claim as new therein, and desire to secure by Letters Patent, is—

1. In a broadcast-seeder, the combination of a seed-box, conveyer-tubes secured to and opening therein, feed-wheels adapted to be adjusted to regulate the feed, and means for determining the amount of feed, shafts rotated by the advance of the carriage operating the feed-wheels, and levers and connections by which the entire machine may be caused to cease operation or either one of said conveyers caused to cease operation, and scattering-spouts leading from the feed-wheels to the ground, together with scattering-disks located at and secured to the ends of the scattering-spouts, as and for the purposes set forth.

2. In a broadcast-seeder, the combination of a supporting-carriage, a feed-box located thereon, a pair of inclined conveyer-tubes opening into and extending from the seed-box on each side of the carriage, a plurality of spouts extending vertically downward from said conveyers and diminishing in length on approaching the extremities thereof, seed-cups secured to the conveyer, said seed-cups opening into said spouts, feed-wheels operated by rotated shafts with said cups, means for regulating and determining the amount of feed, and mechanism for actuating the said shafts, together with levers, rods, and bell-crank angle-irons, by which the entire machine may be thrown out of gear or the conveyer on either side independently caused to cease operation, as set forth.

PERCIVAL V. WADLEIGH.

Witnesses:
C. R. FRIDLEY,
A. T. ROCK.